United States Patent [19]

MacDonald

[11] 3,787,804
[45] Jan. 22, 1974

[54] APPARATUS FOR ENSURING OR ENCOURAGING THE WEARING OF SAFETY BELTS IN VEHICLES

[76] Inventor: Kenneth Donald MacDonald, 16 Upper Garrabost Point, Isle of Lewis, Scotland

[22] Filed: Dec. 15, 1971

[21] Appl. No.: 208,265

[30] Foreign Application Priority Data
Dec. 18, 1970   Great Britain................... 60,290/70
Apr. 23, 1971   Great Britain................... 11,036/71
June 2, 1971    Great Britain................... 18,657/71

[52] U.S. Cl............ 340/52 E, 180/102, 307/10 SB, 340/278
[51] Int. Cl............................ B60g 9/00, B60r 21/10
[58] Field of Search.............. 340/52 E, 278, 62, 53; 180/82 C, 82 R, 101, 102, 105 E, 105 R; 307/10 SB; 200/85 A; 280/150 SB

[56] References Cited
UNITED STATES PATENTS
1,833,908  12/1931  Maybach............................. 340/53
3,438,455  4/1969   Redmond........................ 340/52 E
2,878,885  3/1959   Hamm................................ 180/82 R
2,454,659  11/1948  Leonard........................... 180/105 R
3,401,765  9/1968   Hagon............................... 340/52 E Primary Examiner—Donald J. Yusko
Assistant Examiner—Glen R. Swann, III
Attorney, Agent, or Firm—Norman F. Oblon et al.

[57] ABSTRACT

The invention provides a warning device which is operable by a driver or any of his passengers in a vehicle failing to fasten their safety belts, to limit the throttle opening of the vehicle engine to a predetermined maximum, which may be zero i.e. the idling condition. There is further provided a system in which the warning device is rendered inoperative by means of a switch associated with the driver's seat and so arranged that when the driver assumes an abnormal seating position on the seat this switch renders the warning device inoperative. There is also provided a system in which a further switch is associated with a safety belt, which further switch is sensitive to whether or not at least part of that safety belt is approximately in a predetermined position, whereby if a user is not wearing the belt in a normal position the switch will operate the warning device.

10 Claims, 7 Drawing Figures

PATENTED JAN 22 1974 3,787,804

APPARATUS FOR ENSURING OR ENCOURAGING THE WEARING OF SAFETY BELTS IN VEHICLES

FIELD OF THE INVENTION

This invention relates to apparatus for ensuring or encouraging the wearing of safety belts in vehicles, for example in automobiles. Where used in this specification the term "safety belts" is not intended to imply any particular kind of restraining equipment but is used as a general term in respect of any kind of belt or harness intended to prevent a person being thrown freely from his seat during an accident.

BACKGROUND OF THE INVENTION

In my United Kingdom Pat. No. 1,209,768 there is disclosed a system in which a warning device is connected in series with the battery, ignition switch and ignition coil of an automobile. The warning device is brought into operation by closing the ignition switch and remains in operation until its operation is terminated by the opening of a switch associated with the driver's safety belt, which switch only becomes opened when the driver puts his belt on. Similar switches can also be associated with the passengers' safety belts so that the warning device will not cease to operate until all of the passengers' belts have also been fastened. My above mentioned United Kingdom specification recognises that it would be inconvenient for a passenger to always have to re-fasten his safety belt after leaving his seat, for example upon leaving the automobile, in order to prevent subsequent operation of the warning device and, in order to overcome this inconvenience, proposes to include a further switch in each passenger seat which, in effect, renders the safety belt switch associated with that seat ineffective when a passenger is not occupying the seat and hence operating the switch in the seat. In this way operation of the warning device by an unfastened safety belt at an unoccupied seat is avoided.

In the above mentioned United Kingdom patent a specific type of warning device in the form of a motor-driven circuit interrupter placed in the primary ignition circuit is described. This causes the engine to misfire so long as the warning device is in operation. Other kinds of warning device which may, or may not, actually interfere with the running of the vehicle may be employed, for example audible or visual warning signals. Where used in this specification and claims the term "warning device" means any kind of device which indicates to the driver an undesired condition as regards the fastening of safety belts, whether by means of a signal or by interference with the normal running condition of the vehicle.

It has been found that, although the system described in the above mentioned United Kingdom patent is effective it does have certain drawbacks. When a passenger unfastens his safety belt the warning device operates and, where the warning device interferes with the running of the vehicle, this is undesirable in that the driver cannot immediately take any step himself to regain the usual complete control of the vehicle's running. This will not be obtained until the passenger re-fastens his safety belt. The use of a primary circuit interrupter can cause unburnt fuel to collect in the exhaust system and this can produce atmospheric pollution and back-firing.

Furthermore, there is a possibility of the system being abused by the driver and/or passengers fastening their safety belts without actually wearing them.

Other proposals which suffer from various disadvantages are described in U.S. Pat. Nos. 2,802,073, 3,074,055 and 3,226,674.

SUMMARY OF THE INVENTION

It is an object of the present invention to improve systems for ensuring or encouraging the wearing of safety belts in vehicles.

A further object is to provide a warning device which limits the power output of an engine, when actuated.

A further object is to provide such a device which does not increase atmospheric pollution or produce back-firing.

A still further object is to enable a driver to move an automobile without a warning device operating, when desired and to a restricted extent.

Still a further object is to provide a system in which if a passenger actuates the warning device by unfastening his safety belt, particularly where the warning device interferes with the running of the vehicle, the driver can by his own actions quickly render the warning device temporarily inoperative.

From one aspect, the invention provides a warning device comprising means for limiting the throttle opening of an engine to a predetermined maximum, which may be zero i.e. the idling condition. Such a warning device may be used in a system as disclosed in the above mentioned United Kingdom specification or in a system as disclosed herein.

From a further aspect the invention provides a system comprising a safety belt associated with the driver's seat, a warning device which may be rendered inoperative by fastening said safety belt and a switch associated with the driver's seat and so arranged that when the driver assumes an abnormal seating position on the seat this switch renders the warning device inoperative. In this aspect, the invention is primarily intended for use where the warning device is of a kind which interferes with the running of the vehicle.

From yet another aspect, the invention provides a further switch associated with a safety belt, which further switch is sensitive to whether or not at least a part of that safety belt is approximately in a predetermined position.

Further objects and advantages of the invention will become apparent to those skilled in the art to which the invention relates from the following description of preferred embodiments thereof with reference to the accompanying drawings forming a part of this specification.

DESCRIPTION OF PREFERRED EMBODIMENTS

Figure 1:
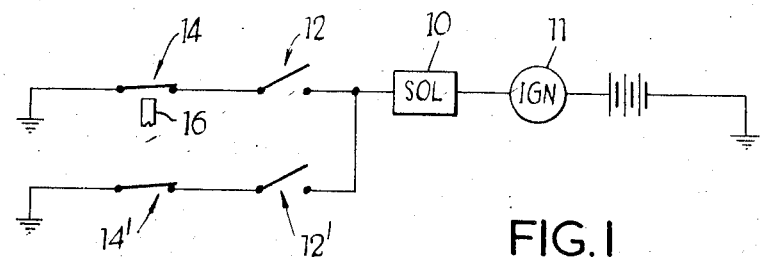
FIG. 1 is a circuit diagram of one system in accordance with the invention.

Referring now to FIG. 1, which shows in schematic form part of the electrical circuit of a motor vehicle, the circuit comprises a solenoid 10 connected in series with the ignition switch 11 of the vehicle. A normally open seat occupancy switch 12 and a normally closed safety belt buckle switch 14, are also connected in series with the solenoid 10. Switch 14 can be a switch which is spring-biassed to its normal position, as is known.

The safety harness for each seat may have a buckle in two parts, each part being secured to an end of a safety belt, as for example in my above mentioned United Kingdom patent. One part of the buckle then contains the switch 14 which is moved to an open position by a plunger 16, mounted in the other part of the buckle, when the two buckle parts are secured together.

The seat occupancy switch 12 is moved to the closed position when the seat is occupied. Thus it can be seen that a circuit is made through the solenoid 10 to energise the solenoid when the seat is occupied to close the switch 12 and the buckle parts are not joined to fasten the belt. In this condition, the solenoid 10 is energised. Before explaining the effect of this energisation, FIGS. 2 and 3 will be referred to.

Figure 2:
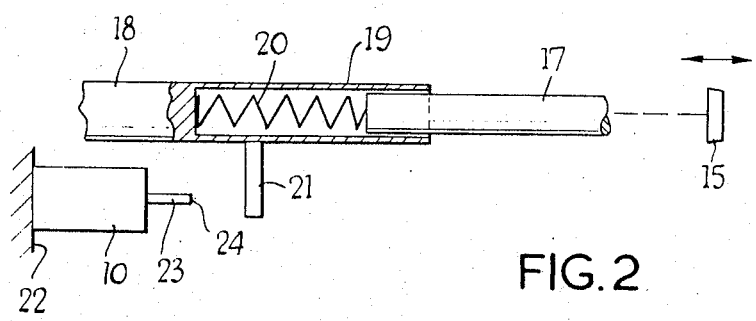
FIG. 2 is an elevation, partly cut-away, of a warning device which may be used in the system of FIG. 1, in its unenergised condition.
Figure 3:
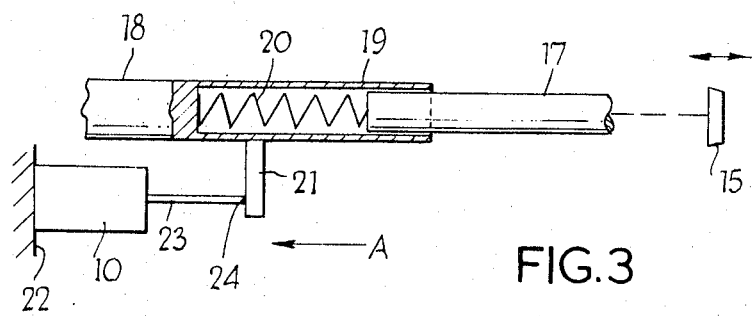
FIG. 3 is a similar view of the warning device of FIG. 2, but in its energised condition.

In FIGS. 2 and 3, 15 represents an automobile throttle pedal which is movable in the directions of the double-headed arrow. A part of the throttle linkage comprises a first shaft 17 which is connected to the throttle pedal 15 to be movable longitudinally thereby and a second shaft 18 from which movement can be transmitted to the throttle of the engine in any suitable manner. The shaft 17 is located within a tubular extension 19 of the shaft 18 and a coil compression spring 20 is located between the base of the tubular extension and the end of the shaft 17. The strength of the spring 20 is such that during normal operation of the throttle pedal the shafts 17 and 18 are maintained in the relative positions shown in FIG. 2, the spring then remaining substantially uncompressed so that movement of the throttle pedal is transmitted through the throttle linkage to the engine throttle.

The shaft 19 is provided with a lateral projection 21. In FIGS. 2 and 3 the solenoid 10 is shown mounted on a fixed part 22 of the automobile and the output shaft 23 of the solenoid has a free end 24 which acts as a stop. When the solenoid 10 is in the unenergised condition as shown in FIG. 2 the stop 24 is spaced sufficiently from the projection 21 to enable the shaft 18 to move throughout its full range in response to corresponding movement of the throttle pedal 15 so that operation of the throttle is not interfered with.

However, when the solenoid 10 is energised by operation of the seat switch 12 as described above, its shaft 23 is driven outwardly so that it restricts the extent to which the projection 21, and hence the shaft 18, can move in the direction of the arrow A in FIG. 3. The solenoid should be sufficiently powerful that when it is in this energised condition pressure on the throttle pedal 15 beyond the point where the projection 21 contacts the stop 24 will simply compress the spring 20, this movement thus being absorbed by the spring 20 and not transmitted to the shaft 18. In this way the throttle opening is limited by the energisation of solenoid 10. The arrangement may be such that when the solenoid 10 is energised the stop 24 immediately comes into contact with the projection 21 so that no movement can be transmitted from the throttle pedal 15 to the shaft 18, the throttle thus being limited to its idling position. In this case it may not be possible to drive the vehicle at all while the solenoid 10 is energised. However, the stop 24 may be so positioned when the solenoid 10 is energised that an initial movement of throttle pedal 15 is transmitted to shaft 18, so that the throttle opening is less limited, for example to a value which will enable the car to be driven very slowly, for instance at about 5 miles per hour. This would enable a driver to drive his car into his garage without having to fasten his seat belt.

However, assuming that the driver wishes to drive the vehicle in a normal way, he will, having energised solenoid 10 by sitting in the driving seat so as to operate switch 12, then have to fasten his seat belt, thereby opening switch 14, in order to de-energise the solenoid 10 and obtain normal throttle operation.

The solenoid 10 could be positioned at a variety of places between the throttle pedal 15 and the actual throttle valve of the engine. It could, for example, act directly on the throttle valve or on an arm connected to it. The lost motion devices i.e. the spring 20 in the embodiment of FIGS. 2 and 3, can also have a variety of positions, between the throttle pedal 15 and the operating point of the solenoid 10.

It will be appreciated that alternative forms of lost motion device may be provided. In particular, when the throttle valve is controlled through a cable arrangement having an inner cable and an outer cable cover which serves as a reaction member, the outer cover may have a coil compression spring inserted in its length to provide the lost motion device.

It will be further appreciated that the present invention is readily applicable to the control of the throttle valve of fuel injection and petrol injection systems as well as the conventional carburettor.

Referring again to FIG. 1, a further set of seat and buckle switches, 12' and 14' respectively, are shown connected in parallel with the switches 12 and 14. Such an additional set of switches can be associated with the seat and safety belt for each passenger in the vehicle so that the warning device will be operative unless the safety belts of the driver and of every seat which is occupied by a passenger are fastened.

The system as it is shown in FIG. 1 overcomes the disadvantages of the interrupter type warning device described in the above mentioned United Kingdom specification and also, when suitably adjusted, enables the vehicle in which it is fitted to be driven very slowly, for example for parking or garaging purposes, without safety belts being fastened. However, it still has the disadvantage that if a passenger unfastens his belt while the vehicle is moving, thus closing belt switch 14', whilst the corresponding seat switch 12' will still be closed, the solenoid 10 will be energised to bias the throttle back to a closed or almost closed position, thus causing a gradual slowing-down of the vehicle. This cannot be immediately remedied by the driver taking action himself.

Figure 4:
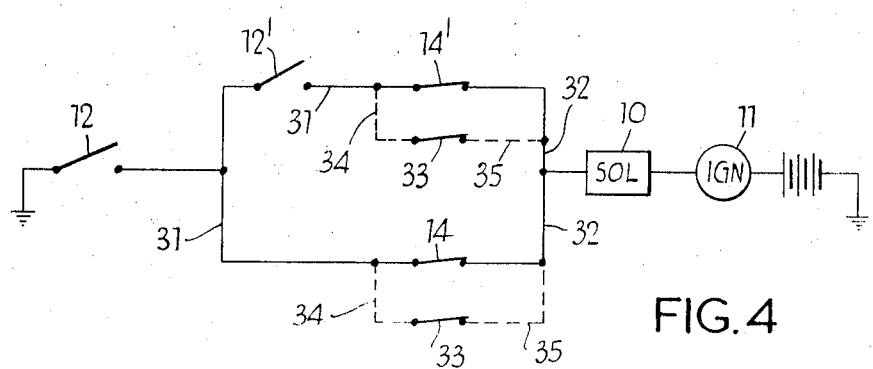
FIG. 4 is a circuit diagram of a further system in accordance with the invention.
Figure 5:
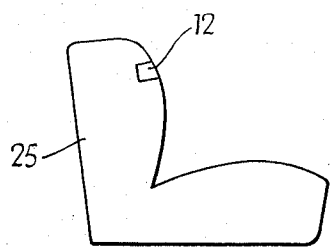
FIG. 5 is a diagrammatic side view of a seat which may be used in the system of FIG. 4.

Referring now to FIGS. 4 and 5, the reference numerals 10, 11, 12, 14, 12' and 14' have the same significance as in FIG. 1, but it is to be noted that in this system the switch 12 associated with the driver's seat is not connected merely in series with the driver's belt switch 14 but is connected in series with all the other seat and belt switches i.e. switches 14, 12' and 14'. It will be appreciated that where there is more than one passenger seat there will be a further parallel branch for each of these additional seats, each branch containing a corresponding seat switch and belt switch.

In the system of FIG. 4 the driver's seat switch 12 is also positioned, as shown in FIG. 5, such that it will be closed when the driver sits in a normal seating position on the seat 25, but will be able to return to its normal open position if the driver assumes an abnormal seating position on the seat. In this particular instance the switch 12 is situated in the back of the driver's seat so that by leaning forwards into an abnormal driving position the driver can permit the switch 12 to open.

This system works generally in a similar way to that shown in FIG. 1 except that in the event that a passenger undoes his safety belt whilst the vehicle is moving, the driver can immediately override the resultant operation of the warning device by leaning forward so as to open switch 12. Thus, where the warning device is of a kind which interferes with the running of the vehicle, for example that shown in FIGS. 2 and 3, this interference need only be very temporary, lasting for perhaps a second or two whilst the driver responds. It will be appreciated that during such a short interval the loss of speed of the vehicle is only very slight.

A further advantage of the system of FIG. 4 is that, for the purpose of driving his car into a garage, or on a very short trip such as from one shop to another, the driver can sit in his seat in the abnormal leaning-forward position and drive his car without the warning device coming into operation. This is particularly advantageous where the warning device is of a type which would otherwise prevent him from moving the car. On the other hand, the driver's abnormal seating position is sufficiently uncomfortable as to dissuade him from overriding the warning system in this way except for the very shortest periods of time. Quite clearly, a driver would not wish to undertake a journey of anything but the shortest length, whilst sitting in an abnormal position and would not be prepared to do so if a passenger were to be reluctant to fasten his safety belt.

Figure 6:
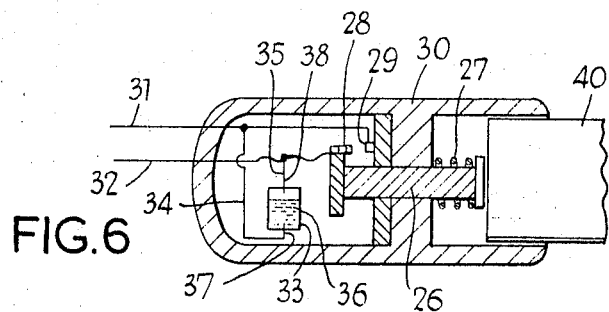
FIG. 6 is a cross-sectional view of a safety belt buckle in accordance with the invention.
Figure 7:
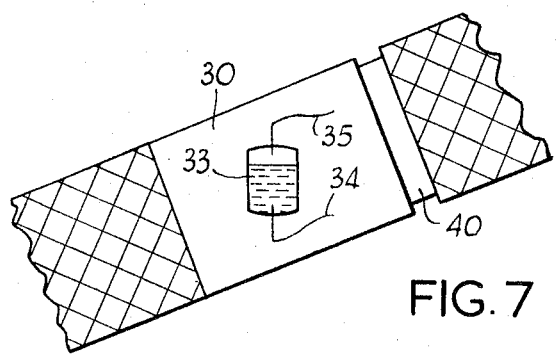
FIG. 7 shows diagrammatically a further safety belt buckle.

FIGS. 6 and 7 show safety belt buckles which incorporate a further switch which is intended to ensure that not only is the belt fastened but is actually being worn by the driver or passenger. Such buckles can be used in systems as described in the above mentioned United Kingdom specification, or as shown in FIGS. 1 and 4 hereof or in other systems.

The buckle shown in FIG. 6 comprises a plunger 26 biassed by a coil spring 27 so that an electrical contact 28 carried by the plunger 26 is normally urged into contact with a further contact 29 secured to body 30 of the buckle. An electrical lead 31 is secured to the contact 29 and an electrical lead 32 is secured to the contact 28. Naturally, the various contacts and leads will be provided with suitable insulation. Contacts 28 and 29 constitute a buckle switch such as is shown at 14 and 14' in FIGS. 1 and 4. The plunger 26 in FIG. 6 is equivalent to the plunger 16 shown schematically in FIG. 1.

Thus, the warning device is normally rendered effective when the contacts 28 and 29 are engaged, as they are when the buckle is unfastened. The plunger 26 is urged to the position shown in FIG. 6 to render the warning device inoperative by fastening the two buckle parts 30, 40, the part 40 pushing the plunger 26 inwards thereby separating contacts 28 and 29, thus breaking the connection between the leads 31 and 32.

A further switch 33 is connected through leads 34, 35 to the leads 31, 32 respectively. The switch 33 is a position-sensitive switch, for example a mercury switch having a chamber 36 containing liquid mercury. The chamber 36 has contacts 37, 38 at opposed ends connected to the leads 34, 35 respectively and hence switch 33 is in parallel with switch contacts 28, 29. The switch 33 is positioned in the body of the buckle so that if the buckle is not approximately in a predetermined orientation, the mercury contacts both the contacts 37, 38 to thereby electrically connect the leads 31, 32.

The switch 33 may be specially adapted to this purpose, for example, by having the upper contact 38 in the form of a plate which is just clear of the surface of the mercury when the buckle is in the normal position it would adopt when worn. If tilted from this position in any direction by more than an amount determined by the position of the plate contact, the switch would become closed. The amount of tolerance permitted by the switch 33 should be such as to accommodate the differences in the normal position of the buckle when worn by people of different shapes. It can be seen that the buckle in FIG. 6 is adapted for wearing in a horizontal position, whereas that in FIG. 7 is adapted for wearing in a diagonal position, the switch 33 being inclined relative to the buckle body 30.

If the safety belt is located around the user in the correct position, then the buckle will be in a position where the mercury does not touch the upper contact 38 and hence the leads 31 and 32 will not be connected.

In FIG. 4 the broken lines and reference numerals 31, 32, 33, 34 and 35 show how the position-sensitive switches are connected into the circuit of the system when buckles of the kind shown in FIGS. 6 and 7 are used in the system. It will be appreciated that the switches 33 are normally i.e. when they have not been specially operated by placing the buckles in their proper orientation, closed. Thus, they have the effect that not only must a safety belt be fastened, thus opening its switch 14 or 14', but in addition the buckle of that safety belt must be approximately in the predetermined proper position, before an open circuit is produced to cut out the warning device. If a user fastens the safety belt but leaves it lying on the seat or floor, the switch 33 will be in a closed condition and hence will render the warning device operative.

A further advantage of the system shown in FIG. 4 is that by leaning forwards at the start of a journey, the driver can override the warning device and drive away before the passengers fasten their safety belts, and then lean back once they have done so.

One other feature which may be incorporated in the system is a switch, located in the gear box, or by a gear-change lever, which is actuated to override the system when reverse gear is selected, so that even if the driver has to lean on his seat occupancy switch 12 when turning his body to see rearwards, it will not be necessary for him to fasten his belt. This is particularly useful for manoeuvring in a car park or a domestic drive or garage.

It will be appreciated that individual warning lights for different seat belts may be presented before the driver to indicate which, if any, of the passengers' safety belts are unfastened.

The warning device of FIGS. 2 and 3 may be modified so that the solenoid is mounted on rod 18 and its output shaft is connected to rod 17, and the solenoid pulling the pedal 15 down to the floor when energised, so that the throttle cannot be opened by using pedal 15. Referring to FIGS. 6 and 7, the buckle can be specially shaped to make it impossible to set the buckle down on edge without switch 33 closing.

I claim:

1. A system for encouraging the wearing of safety belts in a vehicle, said vehicle having an engine and throttle control means, including a throttle pedal, for said engine, comprising a driver's seat, a safety belt associated with said driver's seat, switch means actuatable by fastening said safety belt, a warning device, a seat occupancy switch associated with the driver's seat and so arranged that when the driver assumes a normal seating position on the seat the seat occupancy switch is actuated and when the driver assumes an abnormal seating position on the seat the seat occupancy switch is un-actuated, a circuit in which said switch means, said seat occupancy switch and said warning device are connected, and means for connecting said circuit to an electrical power source, the warning device being deactivated either by un-actuation of said seat occupancy switch or by actuation of said switch means when said safety belt is fastened, whereby the warning device may be deactivated by the driver assuming said abnormal seating position even though the safety belt is unfastened, and the warning device comprising means for positively preventing the throttle opening of the engine from exceeding a predetermined maximum when activated, even when an operator of the vehicle operates the throttle pedal in an attempt to increase the throttle opening above said predetermined maximum.

2. A system as claimed in claim 1 comprising at least one passenger seat, a respective safety belt associated with said at least one passenger seat, a respective further switch means actuatable by fastening a safety belt associated with a passenger seat, said further switch means being connected in said circuit whereby the warning device is de-activated by actuation of said switch means and said further switch means when the driver's and passenger's safety belts are fastened, and the driver's seat occupancy switch being so arranged in the circuit as to de-activate the warning device, when said occupancy switch is un-actuated, irrespective of the condition of the further switch means.

3. A system as claimed in claim 1 comprising position-sensitive switch means associated with said safety belt, said position-sensitive switch means being responsive to at least a part of the safety belt not being approximately in a predetermined position to activate said warning device.

4. A system as claimed in claim 2 comprising respective position-sensitive switch means associated with each of said safety belts, said position-sensitive switch means being responsive to at least a part of the safety belt not being approximately in a predetermined position to activate said warning device.

5. A system for encouraging the wearing of safety belts in a vehicle, comprising a driver's seat, a safety belt associated with said driver's seat, switch means actuatable by fastening said safety belt, a seat occupancy switch associated with the driver's seat and so arranged that when the driver assumes a normal seating position on the seat the seat occupancy switch is actuated and when the driver assumes an abnormal seating position on the seat the seat occupancy switch is un-actuated, a warning device, a circuit in which said switch means, said seat occupancy switch and said warning device are connected, means for connecting said circuit to an electrical power source, the warning device being de-activatable by either said un-actuation of said seat occupancy switch or actuation of said switch means, whereby the warning device may be de-activated by the driver assuming said abnormal seating position even though the safety belt is unfastened.

6. A system as claimed in claim 5 further comprising at least one passenger seat, a respective safety belt associated with said at least one passenger seat, a respective further switch means actuatable by fastening a safety belt associated with a passenger seat, said further switch means being connected in said circuit whereby the warning device is de-activated by actuation of said switch means and said further switch means when the driver's and passenger's safety belts are fastened, and the driver's seat occupancy switch being so arranged in the circuit as to de-activate the warning device, when said occupancy switch is un-actuated, irrespective of the condition of the further switch means.

7. A system as claimed in claim 6 comprising a respective seat occupancy switch associated with each of said at least one passenger's seats, said seat occupancy switch being actuatable by occupancy of the seat with which it is associated, and said seat occupancy switch being connected in said circuit whereby to activate said warning device upon occupancy of said seat, and the driver's seat occupancy switch being so arranged as to de-activate the warning device when the driver's seat occupancy switch is un-actuated, irrespective of the condition of the further switch means and seat occupancy switches associated with each passenger seat.

8. A system as claimed in claim 5 wherein the driver's seat has a back and the driver's seat occupancy switch is located in a part of the back of the driver's seat where it will be actuated by pressure of the diver when the driver assumes said normal seating position on the driver's seat.

9. A system as claimed in claim 6 wherein the driver's seat has a back and the driver's seat occupancy switch is located in a part of the back of the driver's seat where it will be actuated by pressure of the driver when the driver assumes said normal seating position on the driver's seat.

10. A system as claimed in claim 7 wherein the driver's seat has a back and the driver's seat occupancy switch is located in a part of the back of the driver's seat where it will be actuated by pressure of the driver when the driver assumes said normal seating position on the driver's seat.

* * * * *